United States Patent [19]
Lynch

[11] 3,853,332
[45] Dec. 10, 1974

[54] POROUS DIFFUSER FOR GAS SUPPLY TO PASSENGER RESTRAINT

[75] Inventor: Robert W. Lynch, Fountain Valley, Calif.

[73] Assignee: Specialty Products Development Corporation, Oak Creek, Wis.

[22] Filed: Mar. 31, 1972

[21] Appl. No.: 240,035

[52] U.S. Cl. .............. 280/150 AB, 23/281, 138/38
[51] Int. Cl. ............................................ B60r 21/10
[58] Field of Search ................ 280/150 AB; 23/281; 139/38

[56] References Cited
UNITED STATES PATENTS

| | | | |
|---|---|---|---|
| 3,066,014 | 11/1962 | White | 280/150 AB |
| 3,414,292 | 12/1968 | Oldberg | 280/150 AB |
| 3,532,359 | 10/1970 | Teague et al. | 280/150 AB |
| 3,602,527 | 8/1971 | Goetz | 280/150 AB |
| 3,618,981 | 11/1971 | Leising | 280/150 AB |
| 3,666,289 | 5/1972 | Magyar | 280/150 AB |
| 3,692,495 | 9/1972 | Schneiter | 280/150 AB |
| 3,733,180 | 5/1973 | Heineck | 280/150 AB |

Primary Examiner—Kenneth H. Betts
Assistant Examiner—John P. Silverstrim
Attorney, Agent, or Firm—Christie, Parker & Hale

[57] ABSTRACT

A porous diffuser for an inflatable bag passenger restraint system for automobiles is provided between a supply of gas and the inflatable bag. In one embodiment it has a flow cross-section larger than the flow cross-section for gas at some other portion between the gas supply and the inflatable bag. In one embodiment the diffuser is arranged within the bag for cooling, filtering and distributing gas over a large area for avoiding damage to the bag and also for noise suppression. In another embodiment, the diffuser is between a pyrotechnic gas supply and a metering orifice for cooling and filtering the gas, thereby reducing pressure in the pyrotechnic gas generator. If desired the porous diffuser can serve as a flow limiting "orifice".

4 Claims, 3 Drawing Figures

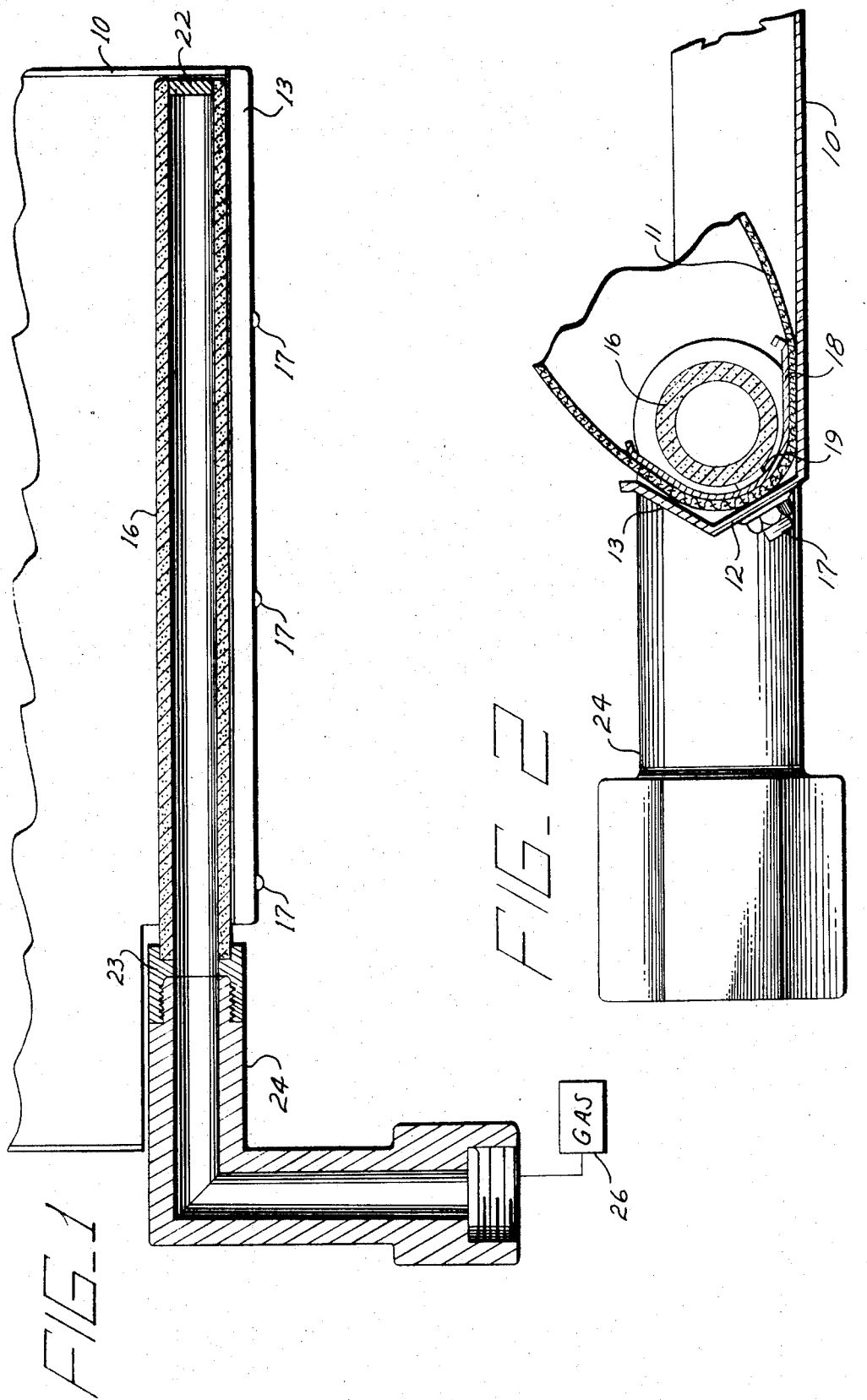

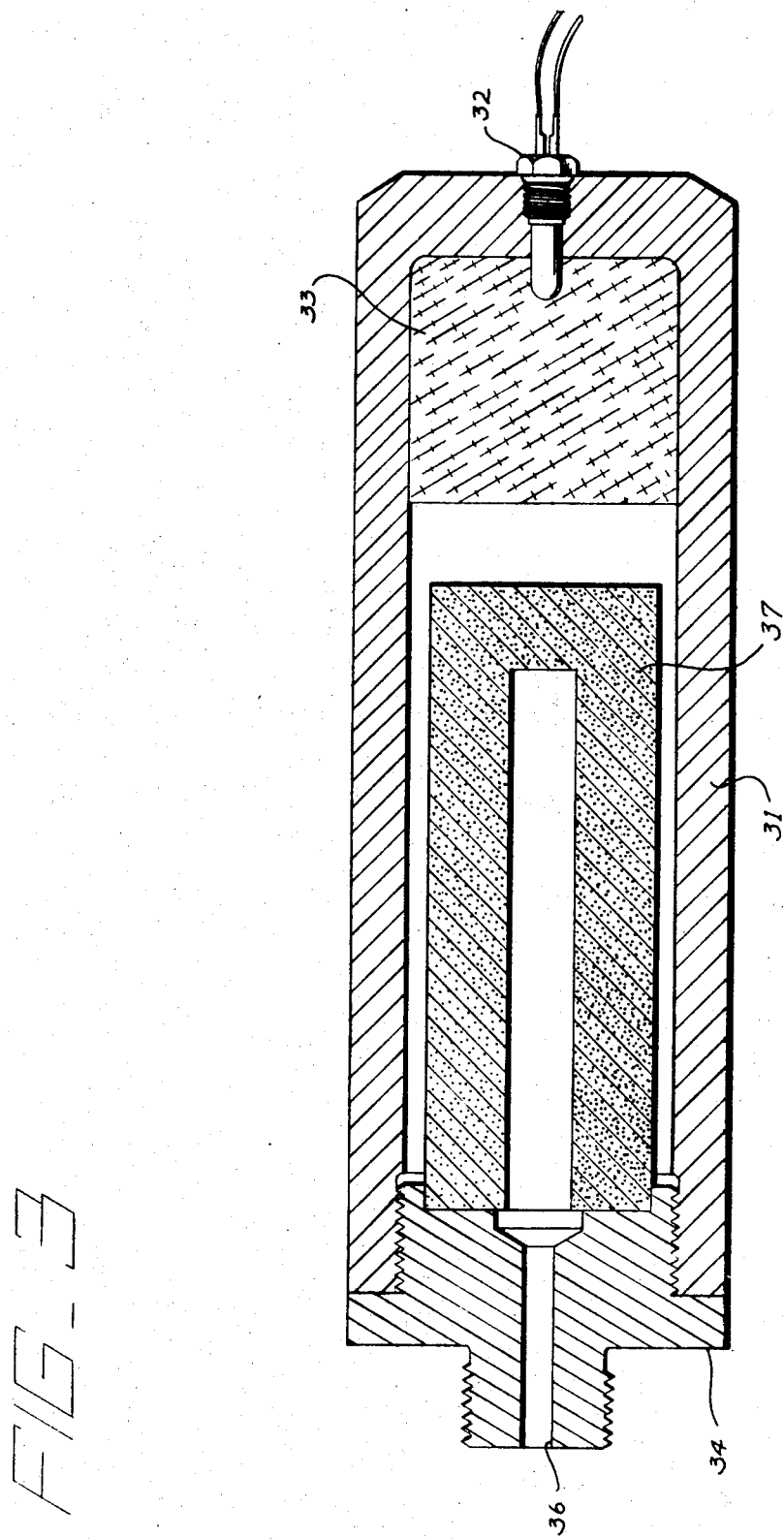

3,853,332

POROUS DIFFUSER FOR GAS SUPPLY TO PASSENGER RESTRAINT

BACKGROUND

Governmental requirements for automobile passenger restraint systems may include an inflatable bag that momentarily and temporarily restrains a passenger during the critical instant of a collision impact. For safe and successful use the bag must be inflated in a very short time at a controlled rate and thereafter deflated to release the passenger. The gas used to inflate the bag must be cool enough to avoid damage to the bag or injury to the passenger. For similar reasons it is important that hot or high velocity particles do not reach the interior of the bag.

Two approaches have been employed for obtaining gas for inflating the bag in a passenger restraint system. In one of these a pressurized gas is contained in a pressure-resistant container. When the system is activated the container is rapidly opened letting the gas flow into the bag. Typically, explosive devices have been used to rupture a portion of the container in order to release a sufficient quantity of gas in a short time. Explosive devices may send shrapnel along with the gases. The rapid expansion of gas causes great cooling, thereby increasing the weight of gas needed for inflation.

Another approach has been to use pyrotechnic mixtures which burn or decompose upon ignition to yield hot gases that flow to the inflatable bag. Some such systems have gases that are too hot for practical operation. Some devices have been built using both pressurized gases and pyrotechnic gas generators with the hot and cold gases mixed for injection into the bag. This can alleviate the temperature problem but significantly increases the complexity, cost, volume, and weight of the system.

Other problems in an inflatable bag passenger restraint system include shrapnel from the gas generating system entering the inflatable bag, with possible damage to the bag or injury to the passenger; a very high and sudden noise level, like a minor explosion; tearing or damage to the bag as deployment commences due to impingement of gas on a small area of the bag; and combined high temperatures and pressures in pyrotechnic generators with consequent safety hazards.

It is therefore highly desirable to provide a means for protecting the inflatable bag and the passenger from shrapnel, hot particles, tearing of the bag, high noise levels, temperature extremes, and high pressure systems.

SUMMARY OF THE INVENTION

There is therefore provided in practice of this invention according to a presently preferred embodiment an improved passenger restraint bag system having a porous diffuser between its gas supply system and the inflatable bag, through which substantially all of the inflating gas passes for heat transfer, filtering, and noise reduction. Preferably the porous diffuser is in the form of a hollow cylinder having its exterior in fluid communication with the gas supply and its interior upstream from a flow limiting orifice.

DRAWINGS

These and other features and advantages of the present invention will be appreciated as the same becomes better understood by reference to the following detailed description of a presently preferred embodiment when considered in connection with the accompanying drawings wherein:

FIG. 1 illustrates in transverse cross-section a porous diffuser constructed according to principles of this invention in an inflatable bag;

FIG. 2 is a transverse cross-section of the embodiment of FIG. 1; and

FIG. 3 illustrates in longitudinal cross-section a gas generator including a porous diffuser.

DESCRIPTION

FIGS. 1 and 2 illustrate in longitudinal and transverse cross section, respectively, a portion of a passenger restraint bag system including a porous metal diffuser constructed according to principles of this invention. As illustrated in this embodiment, the system includes a metal tray 10 upon which a conventional inflatable rubberized fabric bag 11 is folded prior to initiation of the system. The inflatable bag is deleted from FIG. 1 for clarity of illustration and only a fragment of the bag 11 in a partially deployed position is illustrated in FIG. 2. The details of the bag are not material to practice of this invention and conventional or specially designed rubberized fabric bags of varying geometrics may be employed as desired. The portion of bag illustrated in FIG. 2 is that part most remote from the passenger and might, typically, for example, be concealed in the dashboard before deployment. Along the rear edge of the bag holding tray 10 is a generally U-shaped lip or flange having a flat bight 12 upstanding at an angle from the bottom of the tray. A second leg 13 is at an angle to the bight 12 and collectively they serve to confine a portion of the bag 11 along its rear edge.

A porous diffuser 16 extends along the back edge of the tray and is spaced apart from the U-shaped back lip. Three threaded studs 17 extend from the side of the diffuser through the bight 12 of the U-shaped lip. An elongated U-shaped sheet metal deflector 18 extends along the length of the diffuser and is spaced a short distance therefrom by washers 19 on the studs. The bag 11 passes between the tray and the deflector 18 and is pinched between the lip and the deflector when nuts 21 are tightened on the studs 17. Suitable grommets (not shown) may be used on the bag at the stud for sealing and optimum spacing and strength.

The diffuser 16 is in the form of a hollow elongated cylinder having a plug 22 at one end. The plug 22 may be porous or solid as desired. At the opposite end the diffuser is brazed or otherwise joined to an adapter 23 which is threaded onto an L-shaped pipe 24. The other end of the pipe is threaded for connection to a gas supply 26 indicated only schematically in FIG. 1. The gas supply may be a pressurized supply of gas, a pyrotechnic generator or a hybrid system combining the two.

When the system is actuated, gas is released from the gas supply system and flows through the pipe into the interior of the porous diffuser 16. The porosity of the diffuser 16 is such that it has a larger flow cross-section through the porous material than the pipe leading to it. The pressure drop across the diffuser is thus relatively small. In some embodiments other means may be provided for restricting the gas flow path between the gas supply and the porous diffuser. The gas passes through the pores of the diffuser and hence enters the bag over a large area for minimizing the possibility of damage to the bag due to gas impingement. The deflector 18 diverts gas that passes through the diffuser in its rear portion around to the expanding portion of the bag and thereby avoids direct impingement of this gas on a limited area of the bag surface.

Although it is preferred that the gas flow path be more restricted at some other point, the porous diffuser can itself serve to limit gas flow. When the flow limiting structure is at some other position between the gas generator and the bag any partial plugging of the diffuser due to trapped particles or condensed solids will have a relatively small effect.

It is found that with such an arrangement many substantial advantages are obtained. Since the gas enters over a large area corresponding to the outside surface of the diffuser, tearing of the bag due to direct gas impingement is effectively eliminated. The porous diffuser further serves to trap any hot particles or other shrapnel which may be travelling with the gas, thereby avoiding damage to the bag and possible injury to a passenger.

The porous diffuser also serves as a flame arrester when a pyrotechnic gas generator is used, thereby preventing the flame of burning pyrotechnic material from entering and possibly damaging the bag. Surprisingly, the diffuser acts to muffle the sharp loud noise of initiation of inflation. As a further advantage, the gas passing through the porous diffuser is in excellent heat transfer relation thereto so that cold gases are warmed and hot gases are cooled by an amount that is readily controlled by the total heat capacity of the diffuser. With such a diffuser, for example, additional cooling of a hot gas is readily obtained merely by making the walls of the diffuser somewhat thicker and making a corresponding increase in the porosity of the diffuser to maintain the same flow resistance. Since a broad variety of materials, thicknesses and porosities are readily available from a variety of commercial sources, the porous diffuser can be adjusted to provide any desired degree of particle filtration, heat exchange, sound deadening and flow control.

In a typical embodiment the porous diffuser is made of conventional, porous bronze or stainless steel having a mean pore size of about 65 microns and a total weight of about 1.5 to 2.0 pounds. This is sufficient for cooling the gases from a typical pyrotechnic gas generator to less than about 200°F as well as filtering all hot particles over about 20 microns and substantially deadening the sound created by the gas flow. If desired other metals or ceramics may be used for the porous diffuser.

The porous metal diffuser provided in practice of this invention is to be distinguished from a perforated plate or a tube with slits as have been previously suggested for discharging gas into an inflatable bag. Such arrangements do not serve to filter out anything except the largest pieces of shrapnel and do not prevent hot particles from entering a gas bag. Heat transfer between the flowing gases and a perforated plate or slit tube is not very effective and little cooling of hot gases is actually observed. Such embodiments provide no substantial muffling of sound and serve no function whatsoever in arresting flame. A porous diffuser is provided in practice of this invention and is highly effective for all of such purposes.

FIG. 3 illustrates in longitudinal cross-section another embodiment of porous diffuser constructed according to principles of this invention. The embodiment of FIG. 3 is a pyrotechnic gas generator which may be connected directly to the pipe 24 of the embodiments of FIGS. 1 and 2 or may be connected to other means for distributing the generated gas to a passenger restraint bag. As illustrated in the embodiment of FIG. 3, the gas generator comprises a cylindrical housing 31 having a conventional electrical initiator 32 threaded into a closed end of the housing. The initiator is a conventional article having an internal wire (not shown) through which a current is passed to heat the wire to an elevated temperature or even at high currents cause it to explode, thereby initiating a chemical reaction in an explosive within the initiator.

A propellant composition 33 is packed into the housing adjacent the initiator so that when the initiator fires, the propellant composition is ignited. A broad variety of propellant compositions are suitable including many oxidation-reduction reactions producing principally carbon dioxide and water vapor as combustion products. Such gases are generated at high temperatures as the pyrotechnic burns.

At the opposite end of the housing the pyrotechnic is closed by a threaded plug 34 which has an axial passage 36. The cross-section of the passage is carefully controlled so as to present a known resistance to flow of gases from the housing. The passage thus serves as a flow controlling orifice for limiting and controlling gas flow. Brazed into the end plug 34 and extending into the housing is a porous diffuser 37 in the form of a hollow cylinder. The diffuser is preferably sintered stainless steel or bronze to withstand the action of the hot gases or may be ceramic, sintered iron, or the like, as may be desired.

When the propellant mixture is ignited, the hot gases flow through the porous diffuser 37 which has a flow cross-section substantially larger than the flow cross-section of the metering passage 36. The diffuser serves to filter out hot particles of unburned propellant or reaction products and any pieces of environmental barrier (not shown) used to protect the pyrotechnic mixture before initiation.

Of greatest significance, however, is the heat exchange between the hot gases and the porous diffuser as the gases flow therethrough. This yields the result that the pressure in the housing is substantially lower than would be the case without the porous diffuser even though the available internal volume of the housing is substantially reduced by the presence of the diffuser. The gases are cooled by flow through the diffuser and hence substantially reduced in specific volume. The energy in the gas generated is its pressure times its volume which is proportional to temperature. Since energy is removed from the gas by heat transfer to the diffuser, the pressure in the chamber is reduced. Since the thermal energy of the gases has been converted to thermal energy in the material of the porous diffuser, the system is converted to a relatively low pressure system with the inherent safety advantages accompanying it. The walls of the housing are thinner and hence lighter. Portions of the system downstream from the passage 36 can be made thinner and lighter and with less heat resistance than would be the case without the porous diffuser between the pyrotechnic and the flow limiting orifice.

It is preferred that the porous diffuser between the pyrotechnic composition and the flow limiting orifice be in the form of a hollow cylinder with the orifice in fluid communication with the interior of the cylinder.

In this way the hot gases flow from the outside of the cylinder towards the inside. At the outside surface the gases are hotter and the flow cross-section through the porous material is greater. As the gases progress towards the center they are cooled by heat transferred to the porous material and concomitantly the cross-section available for gas flow decreases towards the center of the cylinder. The decreasing temperature of the gas as it goes inwardly means a decreasing volume and hence lessened flow resistance.

In a typical embodiment for a gas generator for producing four cubic feet of gas in a passenger restraint bag, the diffuser is a bronze cylinder having an effective length of about 4½ inch, an outside diameter of about 2⅛ inch, and an inside diameter of about ⅝ inch for a nominal wall thickness of about ¾ inch. The diffuser has a mean pore size of about 165 microns and a density of about 81 gm/cm³. This is found sufficient for cooling the gases from a pyrotechnic mixture to a temperature less than about 200°F at the point at which they enter the passenger restraint bag. The diffuser serves to arrest flame from the pyrotechnic mixture so that neither flame nor hot particles are emitted from the flow limiting passage.

Although the porous diffuser has been described in limited embodiments herein, many modifications and variations will be apparent to one skilled in the art. Thus, for example, a porous diffuser in essentially a flat shape may form one wall of a manifold into which gas is directed for flow into a gas bag adjacent the other side of the diffuser. As another example, a gas generator as illustrated in FIG. 3 may be employed in arrangements other than a passenger restraint system where a substantial volume of cool gas is needed in a very short time interval. Many other modifications and variations will be apparent to one skilled in the art and it is therefore to be understood that within the scope of the appended claims the invention may be practiced otherwise than specifically described.

What is claimed is:

1. In an improved inflatable bag passenger restraint system comprising a gas pyrotechnic generating composition, an inflatable passenger restraint bag, a flow limiting orifice through which gas from the pyrotechnic composition passes before entering the inflatable bag, the improvement comprising a porous diffuser through which substantially all of the gas passes between the pyrotechnic composition and the flow limiting orifice in the form of a hollow cylinder having its exterior in fluid communication with the pyrotechnic composition and its inside in fluid communication with the flow limiting orifice, and having a sufficient mass to reduce the temperature of the gases from the pyrotechnic composition to less than about 200°F at a point where the gases enter the bag.

2. A passenger restraint system comprising:
   an inflatable passenger restraint bag;
   a pressure resistant housing;
   a propellant composition within the housing;
   means for igniting the propellant composition;
   a flow limiting orifice in fluid communication with the interior of the housing and with the interior of the bag; and
   a porous diffuser in the gas flow path between the pyrotechnic composition and the flow limiting orifice and having a larger flow cross-section than the flow cross-section of the orifice in the form of a hollow cylinder having its outside surface in fluid communication with the propellant composition and its inside surface in fluid communication with the flow limiting orifice.

3. An automobile passenger restraint system comprising:
   an inflatable passenger restraint bag;
   a pressure resistant housing;
   a pyrotechnic composition within the housing;
   means for igniting the pyrotechnic composition;
   a porous diffuser in the housing adjacent the pyrotechnic composition so that combustion gas from the pyrotechnic composition flows substantially unimpeded to the diffuser; and
   a flow limiting orifice in fluid communication with the interior of the housing on the opposite side of the diffuser from the pyrotechnic composition and with the interior of the bag, said flow limiting orifice having a flow cross section less than the flow cross section of the diffuser; and wherein
   the porous diffuser is in the form of a hollow cylinder of porous metal having its outside surface in direct fluid communication with the pyrotechnic composition and its inside surface in fluid communication with the flow limiting orifice.

4. An automobile passenger restraint system as defined in claim 3 wherein the porous metal has a mean pore size of about 65 microns.

* * * * *